F. W. SCHULTZ.
Excavators.

No. 135,162.

2 Sheets--Sheet 1.

Patented Jan. 21, 1873.

Witness:
Jas. E. Hutchinson
C. L. Evert

Inventor.
F. William Schultz.
per
Alexander Mason
Attorneys.

F. W. SCHULTZ.
Excavators.
No. 135,162.
2 Sheets--Sheet 2.
Patented Jan. 21, 1873.
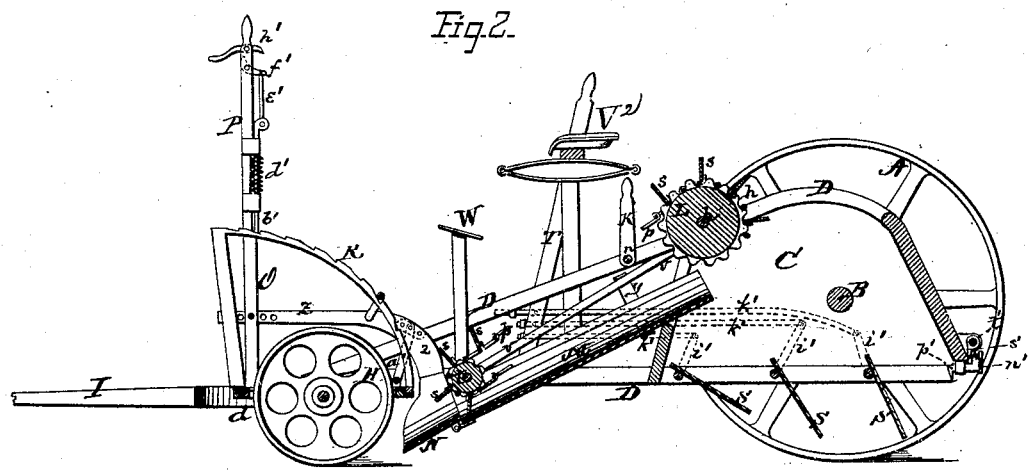
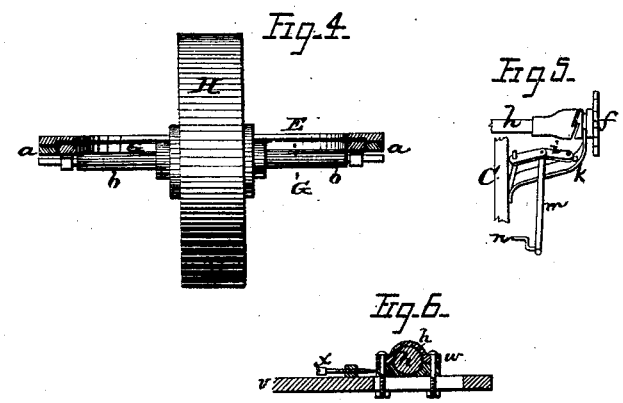

UNITED STATES PATENT OFFICE.

F. WILLIAM SCHULTZ, OF MOUNT PLEASANT, IOWA, ASSIGNOR OF ONE-HALF HIS RIGHT TO WILLIAM E. BEATTY, OF SAME PLACE.

IMPROVEMENT IN EXCAVATORS.

Specification forming part of Letters Patent No. 135,162, dated January 21, 1873.

*To all whom it may concern:*

Be it known that I, F. WM. SCHULTZ, of Mount Pleasant, in the county of Henry and in the State of Iowa, have invented certain new and useful Improvements in Excavator; and do hereby declare that the following is a full, clear, and exact description thereof, reference being had to the accompanying drawing and to the letters of reference marked thereon making a part of this specification.

The nature of my invention consists in the construction and arrangement of an excavator, as will be hereinafter more fully set forth.

In order to enable others skilled in the art to which my invention appertains to make and use the same, I will now proceed to describe its construction and operation, referring to the annexed drawing, in which—

Figure 1:
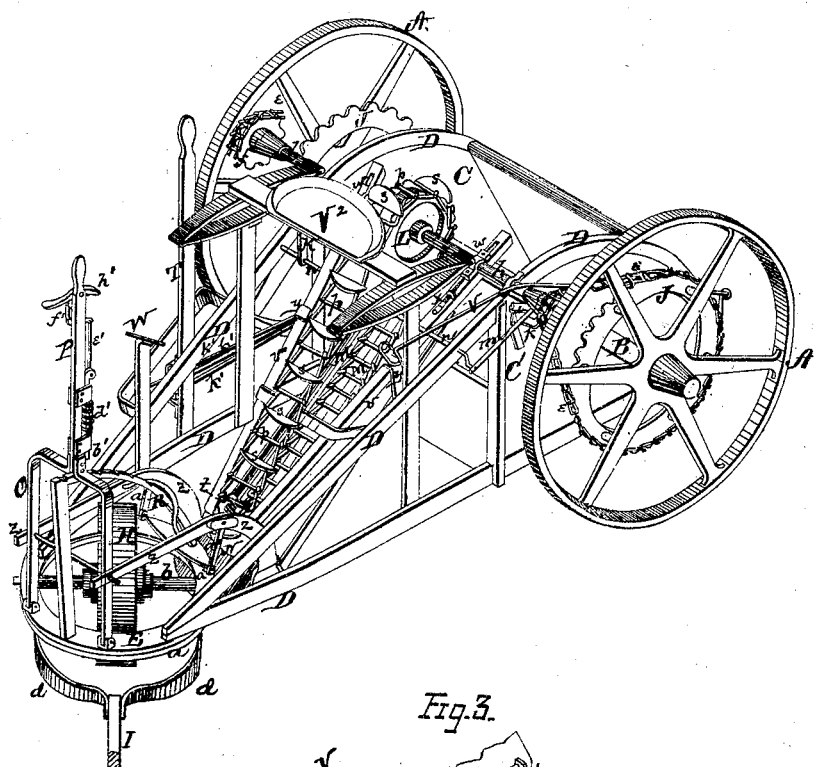
Figure 3:
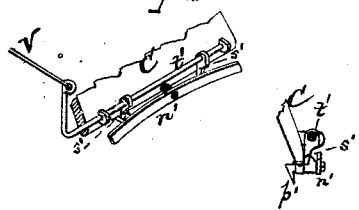
Figure 7:
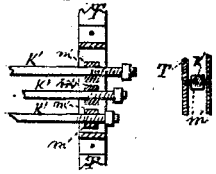

Figure 1 is a perspective view, and Fig. 2 a longitudinal vertical section of my entire excavator. Figs. 3, 4, 5, and 6 are detached views of separate parts thereof.

A A represent the driving-wheels, which are placed one upon each end of the axle B. This axle passes through and is stationary in the sides of the box C. The edges of these side pieces are bound with metal bars D D, which extend forward from the top and bottom of each side for a suitable distance, and their front ends connected together by rivets, bolts, or other suitable means. The front ends of the bars D D, on the two sides of the machine, are connected together by having a circular rim, E, attached horizontally to their under sides. This rim or wheel E is grooved on its under side around the inner edge or circumference, so as to leave a downward-projecting flange, $a$, around the outer edge; or this flange may be made separate and attached to the rim E in the same position. In the groove thus formed is placed another rim or wheel, G, which is held by lugs projecting inward from the flange $a$, or by other suitable means, in such manner that said wheel G may easily turn in the wheel E, thus making a wheel within a wheel. On the under side of the rim or wheel G are attached suitable boxes for the rigid axle $b$, upon the center of which the wheel H is placed, said wheel thus supporting the front end of the machine. By the arrangement of the wheel G within the wheel E, and the wheel H turning or revolving within the same, I am enabled to turn the machine in a very small space. On the outer ends of the axle $b$ are placed the metal bars $d\ d$, the front ends of which are attached to the tongue I, as shown. Upon the inner side of each driving-wheel A is attached a cog-wheel, J, over which passes an endless chain, $e$, connecting with and communicating motion to a pinion, $f$, upon the end of a horizontal shaft, $h$, which is located across the upper front corner of the box C. Each of the pinions $f$ is on its inner side provided with one-half of a clutch, the other half being attached to the shaft $h$, so that the motion communicated to the pinion by the endless chain $e$ may also be communicated to said shaft. Each pinion $f$ is thrown outward so as not to gear by means of a spring, $k$, and this spring is, by a jointed bar, $i$, connected with the side of the box C, as shown in Fig. 5. The bar $i$ is from its joint connected by a bar, $m$, with a crank upon the end of a shaft, $n$, which passes through the top bars D D in front of the box C, and is provided with a lever, K, so that the driver can at any time, by the turning of said lever, throw the machine in and out of gear. On the center of the shaft $h$ is secured a sprocket-wheel, L, over which passes an endless chain, $p$, provided with hoes $s\ s$. The chain $p$ also passes over a smaller sprocket-wheel, $t$, the journals of which have their bearings in the front lower ends of two guide-bars, $v\ v$. These bars spread apart as they extend upward toward the rear, and their upper ends are slotted, as shown in Figs. 1 and 6. Through the slot in each bar $v$ pass the bolts which secure the two parts of a box, $w$, together and hold the same in a place prepared therefor on the shaft $h$, as shown in Fig. 6. Thus the said guide-bars are held to the shaft $h$, but allowed to slide up and down for the purpose of tightening or loosening the endless chain $p$ as occasion may require. This is accomplished by means of a set-screw, $x$, on each bar, which passes through a lug or projection on the same and bears against the lower end of the box $w$. Under the endless chain $p$, with its hoes $s\ s$, is placed a trough or conductor, M, the upper end of which rests in the center of the upper edge of the box-front, and is also suspended by straps $y$ $y$ from the guide-bars $v$ $v$. To the lower end of this conductor or trough is hinged the plow or scoop N. On each side of this plow is a forwardly-curved arm, $z$, the front end of which is pivoted to a frame, O, hinged on the upper side of the front part of the rim or wheel E. At the bend of the arm $z$ it is also, by a pivoted link, $a'$, connected with the rear part of said wheel E. In the center of the frame O is a lever, P, extending upward in the same plane as the frame, and in suitable guides on the same is placed a pawl, $b'$, which is forced downward by a spring, $d'$, and its upper end connected by a rod, $e'$, with an L-shaped lever, $f'$, pivoted to the side of the lever P. The lever $f'$ is actuated by means of a thumb-lever, $h'$, also pivoted to the lever P for the purpose of raising the pawl or bolt $b'$ from the notches in a curved bar, R, attached to the wheel E. By this means the plow may be raised and lowered at will to regulate the depth of the excavation and to raise it entirely out of the ground when desired. As a further adjustment for the same purpose the front ends of the bars $z$ $z$ are provided with a number of holes, so that their points of connection with the frame O may be changed at will.

When the machine is in operation the dirt is carried by the hoes $s$ $s$ on the endless chain $p$ from the plow N up the trough or conductor M into the box C.

The bottom of this box is composed of a series of gates, S S, each of which is pivoted, near its front edge, in the bottom bar D of the box, and when closed the rear edge of each gate rests upon the front edge of the gate immediately in rear of it. Upon one of the journals of each gate S is a crank, $i'$, which cranks are all on one side of the machine, and upon each crank is pivoted a rod, $k'$, which extends forward and passes through a swinging or oscillating bearing, $m'$, placed in a box on the side of a lever, T, pivoted on the side of the lower bar D. A nut is then adjusted upon the end of each rod $k'$; and by the movement of the lever T the gates S S are raised simultaneously to close the bottom of the box in the manner above described, the rear edge of the rear or last gate being caught upon two catches, $p'$, sliding in guides under the rear end of the box C and pressed inward by means of a spring, $n'$. The catches $p'$ $p'$ are withdrawn by means of two arms, $s'$, projecting downward from a shaft, $t'$, at the rear end of the box, upon one end of which shaft is a crank with a rod, V, extending forward, so that the driver, by pulling on said rod, will withdraw the catches and dump the load. $V^2$ is the driver's seat, which is so arranged with the various levers that the driver can operate the same when desired. W is simply a foot-rest for the driver.

Having thus fully described my invention, what I claim as new, and desire to secure by Letters Patent, is—

1. The arrangement of the box C with the metal bars D D, binding its side edges and extending forward to form the frame of my machine, substantially as herein set forth.

2. The combination of the stationary ring E grooved on its under side, the rotating ring G, rigid axle $b$, wheel H, metal straps $d$ $d$, and tongue I, all constructed and arranged substantially as and for the purposes herein set forth.

3. The arrangement of the drive-wheels A with cog-wheels J, endless chains $e$, and pinions $f$ with clutches for operating the shaft $h$, substantially as herein set forth.

4. The arrangement of the crank-shaft $n$ with lever K, links $m$ $m$, jointed bars $i$ $i$, and springs $k$ $k$ for throwing the pinions $f$ $f$ in and out of gear, substantially as herein set forth.

5. The combination of the hoes $s$ $s$ on the endless chain $p$, the trough M, and the plow N, hinged to the lower end of said trough, substantially as and for the purposes herein set forth.

6. The arrangement, with the plow, conductor, and hoes, of the curved arms $z$, hinged frame O with lever P and spring-pawl $b'$, rack R, and connecting arms $a'$, all substantially as and for the purposes herein set forth.

7. The oscillating bearings $m'$ arranged in or upon the lever T, and each having a rod, $k'$, passing through it, in combination with the cranks $i'$ and the gates S, all substantially as and for the purposes herein set forth.

In testimony that I claim the foregoing I have hereunto set my hand this 31st day of August, 1872.

F. WM. SCHULTZ.

Witnesses:
A. B. PATTON,
THEO. BIGLER.